United States Patent Office 2,992,896
Patented July 18, 1961

2,992,896
PREPARATION OF CARBONYL SULFIDE
Fred Applegath and Raymond A. Franz, El Dorado, Ark., assignors to Monsanto Chemical Company, St. Louis, Mo., a corporation of Delaware
No Drawing. Filed Jan. 2, 1959, Ser. No. 784,442
9 Claims. (Cl. 23—203)

This invention pertains to carbonyl sulfide (COS) and more particularly to a method for its preparation.

It is well known in the art that COS can be prepared by the reaction of carbon monoxide and sulfur at very high temperatures, such as from 675° to 840° C. The reaction does not proceed at low temperatures. No COS is formed by passing CO through molten sulfur at low temperatures, such as from 130° C. to 240° C. It is an object of this invention to provide a process for producing COS at relatively low reaction temperatures. Other objects will become apparent from the description of the invention.

It has now been discovered that COS can be prepared by reacting carbon monoxide and sulfur in a liquid monohydric or polyhydric aliphatic alcohol, preferably containing from 1 to 12 carbon atoms, having dispersed therein $H_2S$ and a tertiary alkylamine. The following examples illustrate this invention.

Example I

A semi-continuous reactor was made from a 1" x 7' stainless steel pipe packed with 6 x 6 cm. protruded metal. The top three feet acted as a condenser for the solvent. The product gas stream was controlled by a valve at the top of the column. The solvent was circulated up through the bottom four feet of the reactor into a lump-sulfur holder and back into the reactor at the bottom. This kept the solution saturated with sulfur. The carbon monoxide and $H_2S$ entered the reactor at the bottom. CO was fed at 1.0 g./min. and the pressure maintained at 100 p.s.i.g. Using 200 ml. of methanol as the solvent, dispersing therein 10 g. of sulfur, 200 g. of tri-n-butylamine, approximately 30 g. of $H_2S$ and maintaining a reaction temperature of 90° C., resulted in a product gas containing 25 mol percent COS.

Example II

The procedure set forth in Example I is repeated using ethanol as the solvent and trimethylamine as the tertiary alkylamine. A good yield of COS is obtained.

Example III

The procedure set forth in Example I is repeated using n-propanol as the solvent and tri-n-propylamine as the tertiary alkylamine. A good yield of COS is obtained.

Example IV

The procedure set forth in Example I is repeated using isobutanol as the solvent and ethyldimethylamine as the tertiary alkylamine. A good yield of COS is obtained.

Example V

The procedure set forth in Example I is repeated using tert.-butanol as the solvent and triethylamine as the tertiary alkylamine. A good yield of COS is obtained.

Example VI

The procedure set forth in Example I is repeated using 2-methylpentanol as the solvent and triisopropylamine as the tertiary alkylamine. A good yield of COS is obtained.

Example VII

The procedure set forth in Example I is repeated using 2-ethylhexanol as the solvent and tri-2-ethylhexylamine as the tertiary alkylamine. A good yield of COS is obtained.

Example VIII

The procedure set forth in Example I is repeated using glycerine as the solvent and tri-n-butylamine as the tertiary alkylamine. A good yield of COS is obtained.

Example IX

The procedure set forth in Example I is repeated using propylene glycol as the solvent and triethylamine as the tertiary alkylamine. A good yield of COS is obtained.

Example X

The procedure set forth in Example I is repeated using ethylene glycol monomethyl ether as the solvent and triisopropylamine as the tertiary alkylamine. A good yield of COS is obtained.

In carrying out the process of this invention the reaction temperature can be varied substantially. Temperatures as low as 25° C. and as high as 300° C. can be used with temperatures within the range of from about 70° C. to about 150° C. being preferred. Similarly, the reaction pressure can also be varied considerably. Atmospheric pressure can be used although elevated pressures are most suitable. A pressure of at least 50 p.s.i.g. is preferred and pressures as high as 1000 p.s.i.g. can be used if desired.

Considerable variation in the quantities of reactants is possible. Sulfur is generally employed in excess of the stoichiometric quantities for practical reasons. Either sulfur or CO may be used in excess as the quantities of these reactants are not a critical factor. The quantity of the tertiary alkylamine can be varied from about 0.05 to about 50 parts by weight for each part by weight of sulfur employed. While the quantity of $H_2S$ employed can be varied substantially, it is preferably employed in the amount of about one mol for each mol of sulfur used. The quantity of solvent used is not critical but should be sufficient to provide a good dispersion of reactants and a fluid reaction medium to permit intimate contact of the reactants.

The reaction can be carried out as a batch reaction or as a continuous process in a suitable column providing for continuous concurrent or countercurrent contact. The COS can be recovered from the product gases by any technique well known to those skilled in the art. The reaction gases can be cooled to Dry Ice temperatures and the COS condensed therefrom as a liquid or it can be recovered by solvent extraction.

What is claimed is:

1. A process for preparing carbonyl sulfide which comprises reacting carbon monoxide and sulfur in an aliphatic alcohol having dispersed therein a tertiary alkylamine and $H_2S$ at a temperature ranging from about 25° C. to about 300° C.

2. The process as described in claim 1 wherein the alcohol contains from 1 to 12 carbon atoms.

3. The process as described in claim 2 wherein the tertiary alkylamine is employed in an amount ranging from 0.05 part to about 50 parts by weight for each part by weight of sulfur employed.

4. The process as described in claim 3 wherein the tertiary alkylamine and $H_2S$ are employed in approximately equimolecular proportions.

5. The process as described in claim 4 wherein the tertiary alkylamine is tri-n-butylamine.

6. The process as described in claim 4 wherein the tertiary alkylamine is trimethylamine.

7. The process as described in claim 4 wherein the tertiary alkylamine is tri-n-propylamine.

8. The process as described in claim 4 wherein the tertiary alkylamine is triethylamine.

9. The process as described in claim 4 wherein the tertiary alkylamine is triisopropylamine.

References Cited in the file of this patent

UNITED STATES PATENTS

| | | |
|---|---|---|
| 2,080,360 | Lepsoe | May 11, 1937 |
| 2,728,638 | Morningstar | Dec. 27, 1955 |
| 2,767,059 | Adcock et al. | Oct. 16, 1956 |

OTHER REFERENCES

Mellor: Comprehensive Treatise on Inorganic and Theoretical Chemistry, vol. 5, pages 972 and 973, 1924.